US012705437B2

(12) United States Patent
Schornig et al.

(10) Patent No.: US 12,705,437 B2
(45) Date of Patent: Aug. 11, 2026

(54) EVALUATION FRAMEWORK FOR LLM-BASED NETWORK TROUBLESHOOTING AND MONITORING AGENTS

(71) Applicant: Cisco Technology, Inc., San Jose, CA (US)

(72) Inventors: Eduard Schornig, Haarlem (NL); Jean-Philippe Vasseur, Combloux (FR); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 235 days.

(21) Appl. No.: 18/388,003

(22) Filed: Nov. 8, 2023

(65) Prior Publication Data

US 2025/0148222 A1 May 8, 2025

(51) Int. Cl.

*G06F 40/58* (2020.01)
*G06F 40/51* (2020.01)
*G06N 3/0455* (2023.01)
*H04L 41/046* (2022.01)
*H04L 41/16* (2022.01)

(52) U.S. Cl.

CPC .............. *G06F 40/58* (2020.01); *G06F 40/51* (2020.01); *G06N 3/0455* (2023.01); *H04L 41/046* (2013.01); *H04L 41/16* (2013.01)

(58) Field of Classification Search

None

See application file for complete search history.

(56) References Cited

U.S. PATENT DOCUMENTS

| | | | | |
|---|---|---|---|---|
| 8,185,373 | B1 * | 5/2012 | Messenger | G06F 40/51 704/9 |
| 2017/0169354 | A1 | 6/2017 | Diamanti et al. | |
| 2021/0158146 | A1 * | 5/2021 | Singh | G06N 20/20 |
| 2022/0138081 | A1 | 5/2022 | Varma et al. | |
| 2022/0261667 | A1 | 8/2022 | Rayes et al. | |
| 2023/0237275 | A1 | 7/2023 | Wang et al. | |
| 2024/0104125 | A1 * | 3/2024 | Pham | G06F 16/3329 |
| 2025/0068398 | A1 * | 2/2025 | Zeng | G06F 8/35 |

OTHER PUBLICATIONS

Github: "Shap/Shap: A Game Theoretic Approach to Explain the Output of Any Machine Learning Model", 2023, 13 Pages.

Lundberg S., "The Art of Prompt Design: Prompt Boundaries and Token Healing", Towards Data Science, May 8, 2023, 17 Pages.

Wang L., et al., "A Survey on Large Language Model based Autonomous Agents", arXiv:2308.11432v2 [cs.AI], Sep. 7, 2023, pp. 1-35.

* cited by examiner

*Primary Examiner* — Antim G Shah

(74) *Attorney, Agent, or Firm* — Lee & Hayes, P.C.

(57) ABSTRACT

In one implementation, a device uses a large language model-based agent to perform a task in a network, to obtain a first result. The device executes code in the network to perform the task, to obtain a second result. The device makes a comparison between the first result and the second result. The device provides, based in part on the comparison, one or more performance metrics for the large language model-based agent for display.

20 Claims, 14 Drawing Sheets

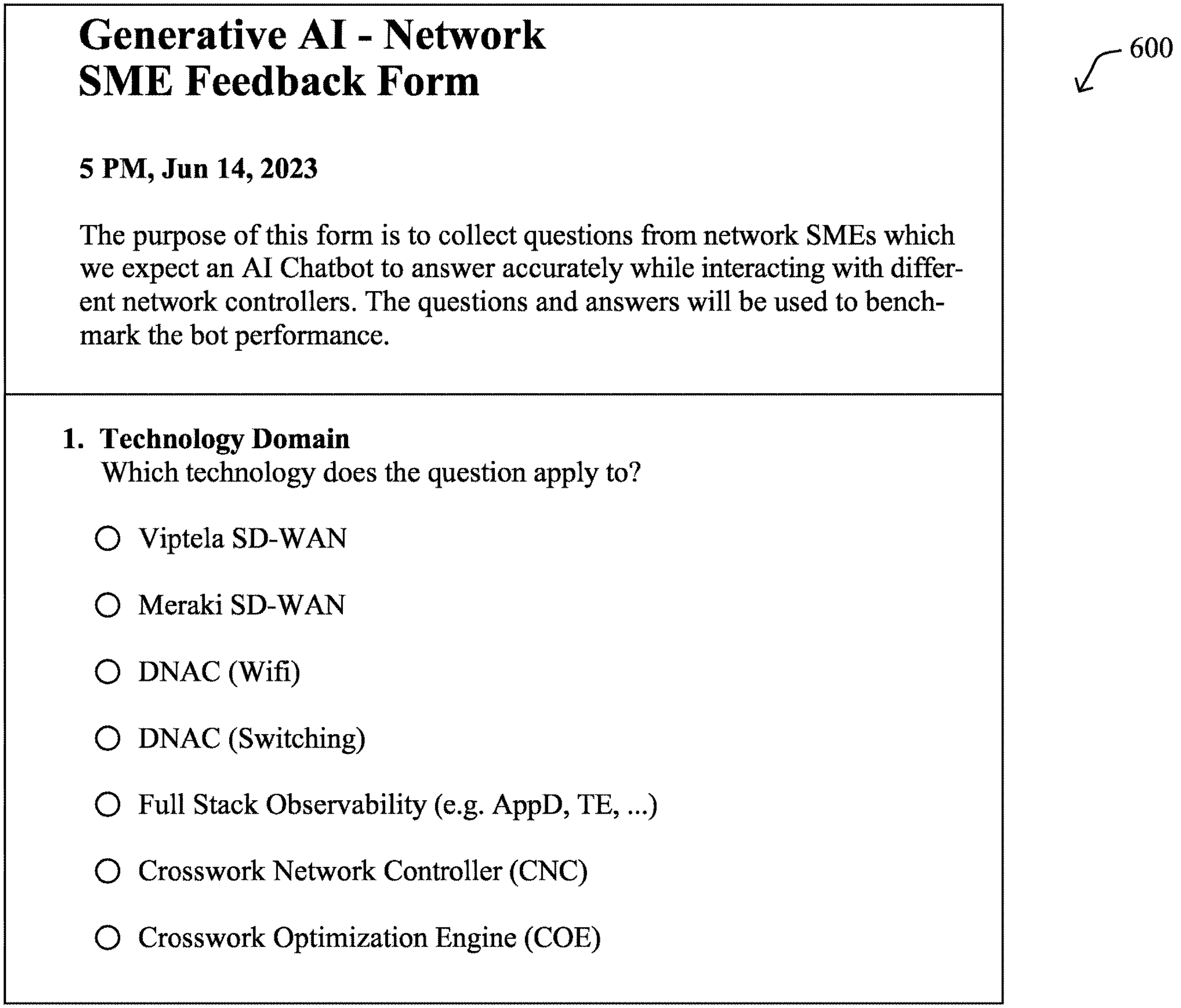

Generative AI - Network
SME Feedback Form

5 PM, Jun 14, 2023

The purpose of this form is to collect questions from network SMEs which we expect an AI Chatbot to answer accurately while interacting with different network controllers. The questions and answers will be used to benchmark the bot performance.

1. Technology Domain
   Which technology does the question apply to?

○ Viptela SD-WAN

○ Meraki SD-WAN

○ DNAC (Wifi)

○ DNAC (Switching)

○ Full Stack Observability (e.g. AppD, TE, ...)

○ Crosswork Network Controller (CNC)

○ Crosswork Optimization Engine (COE)

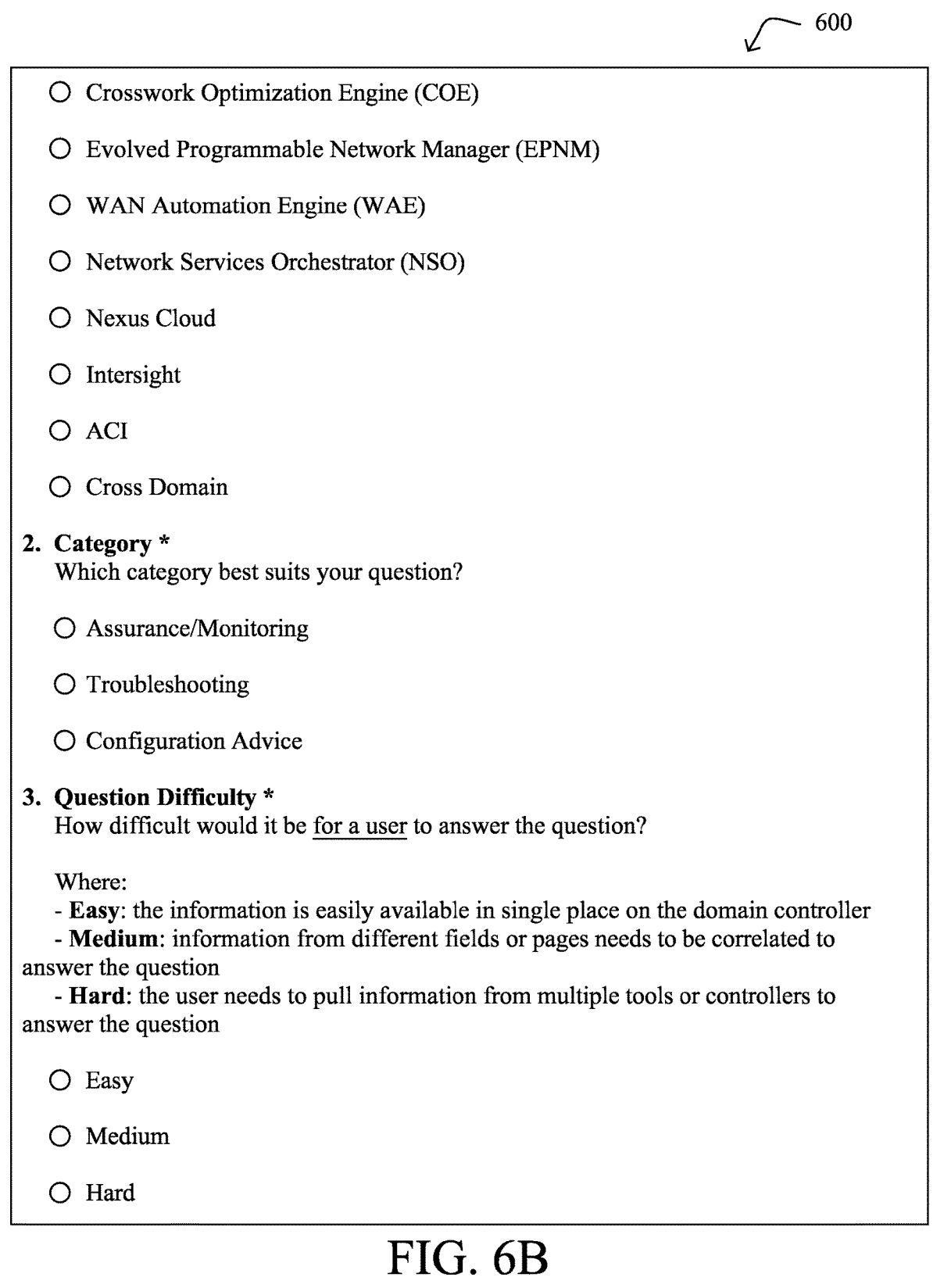

600

- ○ Crosswork Optimization Engine (COE)
- ○ Evolved Programmable Network Manager (EPNM)
- ○ WAN Automation Engine (WAE)
- ○ Network Services Orchestrator (NSO)
- ○ Nexus Cloud
- ○ Intersight
- ○ ACI
- ○ Cross Domain

2. Category *
Which category best suits your question?

- ○ Assurance/Monitoring
- ○ Troubleshooting
- ○ Configuration Advice

3. Question Difficulty *
How difficult would it be for a user to answer the question?

Where:
- Easy: the information is easily available in single place on the domain controller
- Medium: information from different fields or pages needs to be correlated to answer the question
- Hard: the user needs to pull information from multiple tools or controllers to answer the question

- ○ Easy
- ○ Medium
- ○ Hard

FIG. 6B

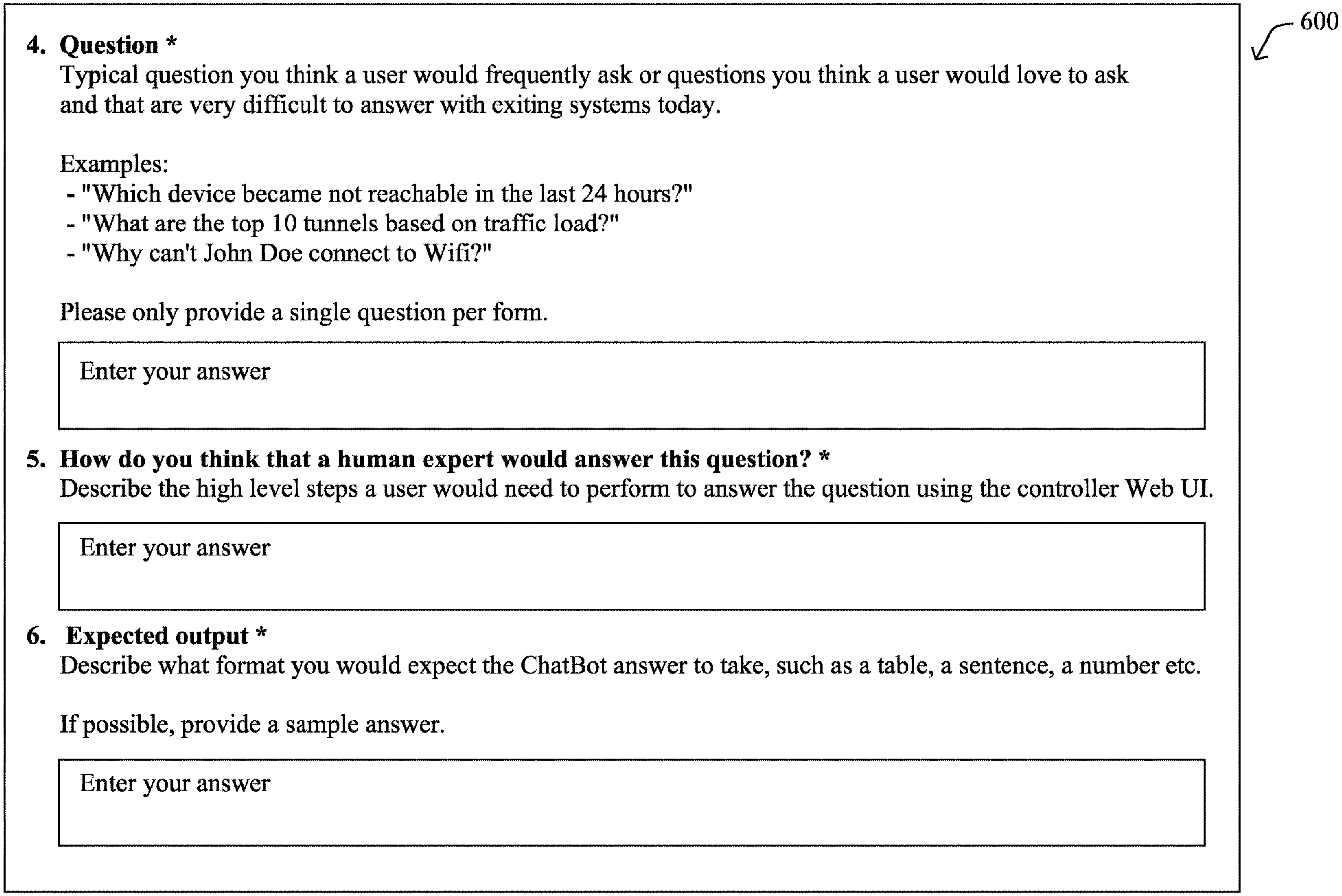

4. Question *
Typical question you think a user would frequently ask or questions you think a user would love to ask and that are very difficult to answer with exiting systems today.

Examples:
- "Which device became not reachable in the last 24 hours?"
- "What are the top 10 tunnels based on traffic load?"
- "Why can't John Doe connect to Wifi?"

Please only provide a single question per form.

Enter your answer

5. How do you think that a human expert would answer this question? *
Describe the high level steps a user would need to perform to answer the question using the controller Web UI.

Enter your answer

6. Expected output *
Describe what format you would expect the ChatBot answer to take, such as a table, a sentence, a number etc.

If possible, provide a sample answer.

Enter your answer

700

```
@tc.case (tags={"demo", "type: troubleshooting", "difficulty:medium", "controller:dnac"})
def uc1_q6_user_device_health(eval context: EvaluationContext) -> TestOutput Type:
    """Which location is a user connected to and what is it's health score?"""

    # UC-1 Troubleshooting 06.1

    user_info = eval context.api client.dnac.users.get user enrichment details (
        "network_user_id", DNAC_USER ["name"]
    ).pop()

    yield Test CaseQuestion (
        "Which location is user {username} connected to and what is it's health score?",
        username=DNAC_USER ["name"],
    )

    yield Expected Methods("dnac.users.get user enrichment details")

    if user info["userDetails"]:
        health score = [
            score["score"]
            for score in user info["userDetails"]["healthScore"]
            if score["healthType"] == "OVERALL"
        1.pop()

        yield Expected Output (user_info["userDetails"]["location"], health score, how="all")

    else:
        yield ExpectedOutput("not connected", "could not find", how="any") ExpectNegative()
```

```
yield (
  ExpectedOutput ( ["AAA", ise_server_address, "drop", sdwan_cp_policy], how="all")
  |  ExpectedOutput ( ["AAA", ise_server_address, "discard", sdwan_cp_policy], how="all")
  |  ExpectedOutput ( ["AAA", "drop", sdwan_cp_policy], how="all")
  |  ExpectedOutput ( ["aaa", "drop", sdwan_cp_policy], how="all")
  |  ExpectedOutput ( [ise_server_address, "drop", sdwan_cp_policy], how="all")
  |  ExpectedOutput ( [ise_server_address, "discard", sdwan_cp_policy], how="all")
  |  ExpectedOutput ( [ise_server_address, sdwan_cp_policy], how="all")
  |  ExpectedOutput ( [ise_server_address, "drop"], how="all")
  |  ExpectedOutput ( [ise_server_address, "discard"], how="all")
)
```

FIG. 9

EVALUATION FRAMEWORK FOR LLM-BASED NETWORK TROUBLESHOOTING AND MONITORING AGENTS

TECHNICAL FIELD

The present disclosure relates generally to an evaluation framework for large language model (LLM)-based network troubleshooting and monitoring agents.

BACKGROUND

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

When applied in the context of communication networks and used to solve tasks such as network troubleshooting and monitoring, even advanced LLM agents frequently struggle with issues such as hallucinations (making up facts in an otherwise convincing tone) and consistency (providing the same answer when prompted with same question multiple times). Accurately and reliably evaluating the performance of LLM agents in the context of tasks such as the ones previously mentioned, is a non-trivial ask and has so far been lacking. In addition, agents are complex state machines with many hyper-parameters (which models to use, which prompts to use, how to integrate retrieval and planning, etc.), and assessing how to improve an existing agent can be a tall order without a very systematic approach with strong quantitative grounds.

BRIEF DESCRIPTION OF THE DRAWINGS

The implementations herein may be better understood by referring to the following description in conjunction with the accompanying drawings in which like reference numerals indicate identically or functionally similar elements, of which:

FIGS. 6A-6C illustrates an example form to collect questions from a subject matter expert (SME);

FIG. 7 illustrates an example snippet of a testcase to assess an LLM-based network troubleshooting and monitoring agents;

FIG. 9 illustrates an example snippet of expected outputs of an LLM-based network troubleshooting and monitoring agent.

DESCRIPTION OF EXAMPLE IMPLEMENTATIONS

Overview

Figure 1A:
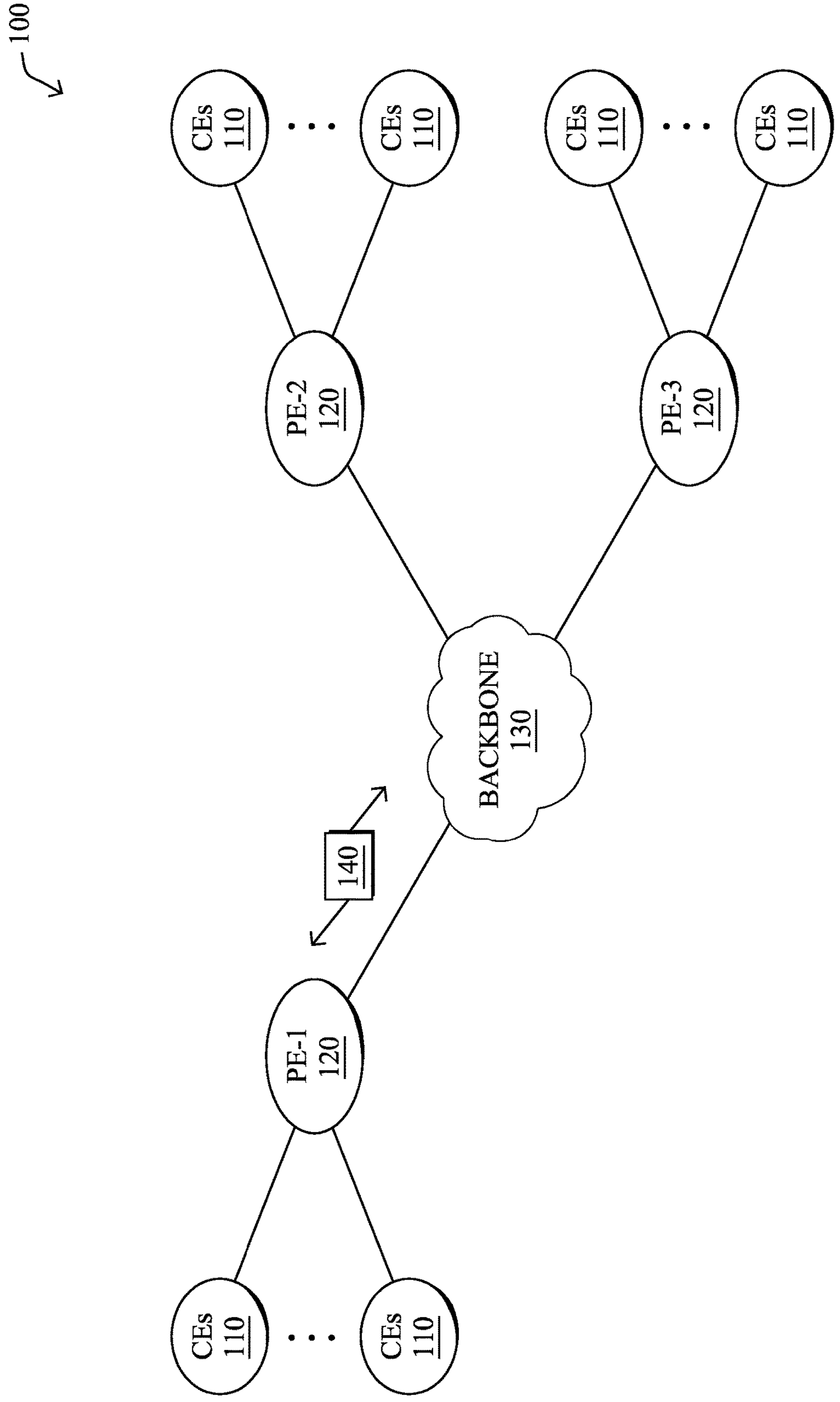
FIGS. 1A-1B illustrate an example communication network.

According to one or more implementations of the disclosure, a device uses a large language model-based agent to perform a task in a network, to obtain a first result. The device executes code in the network to perform the task, to obtain a second result. The device makes a comparison between the first result and the second result. The device provides, based in part on the comparison, one or more performance metrics for the large language model-based agent for display.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
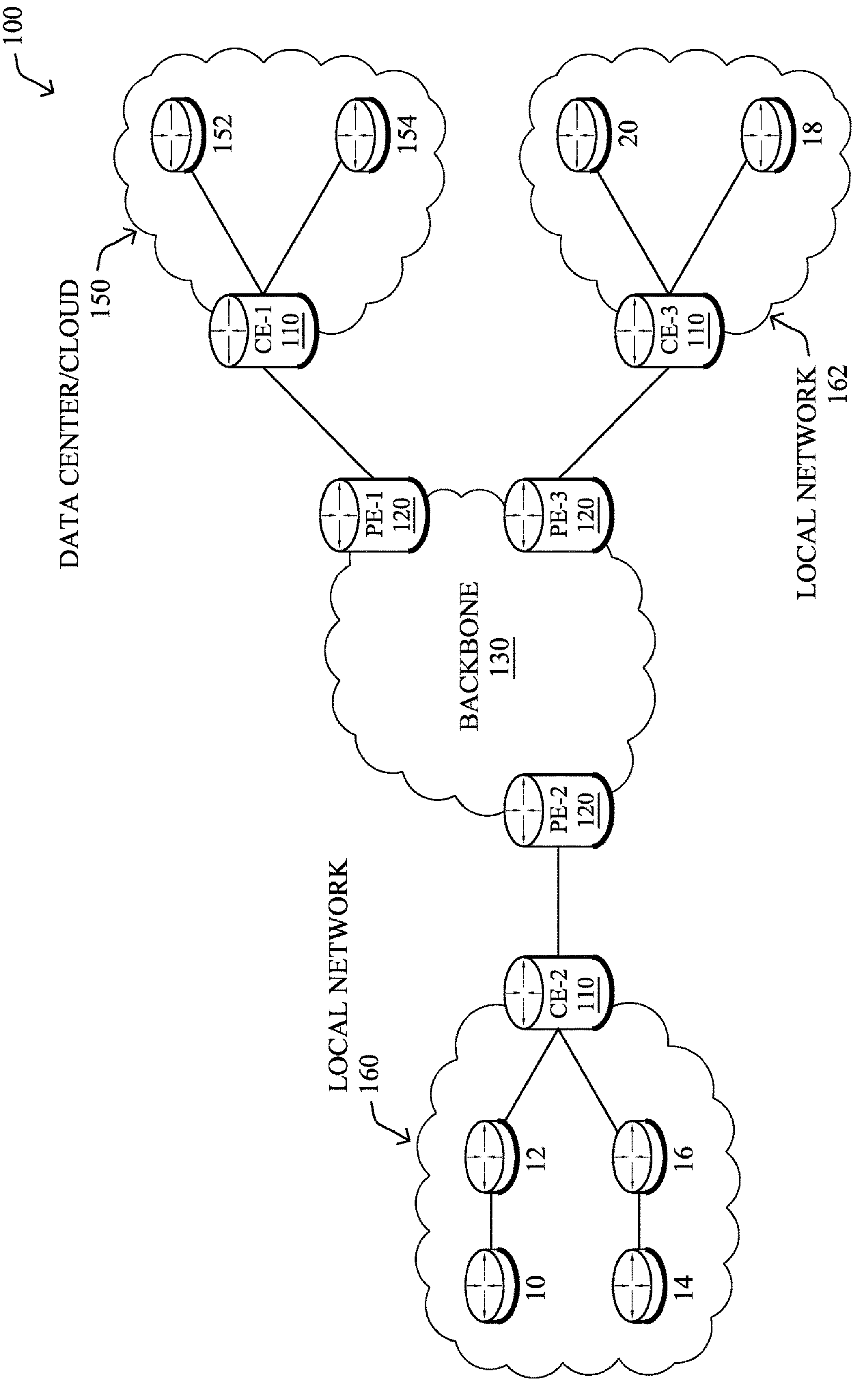

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
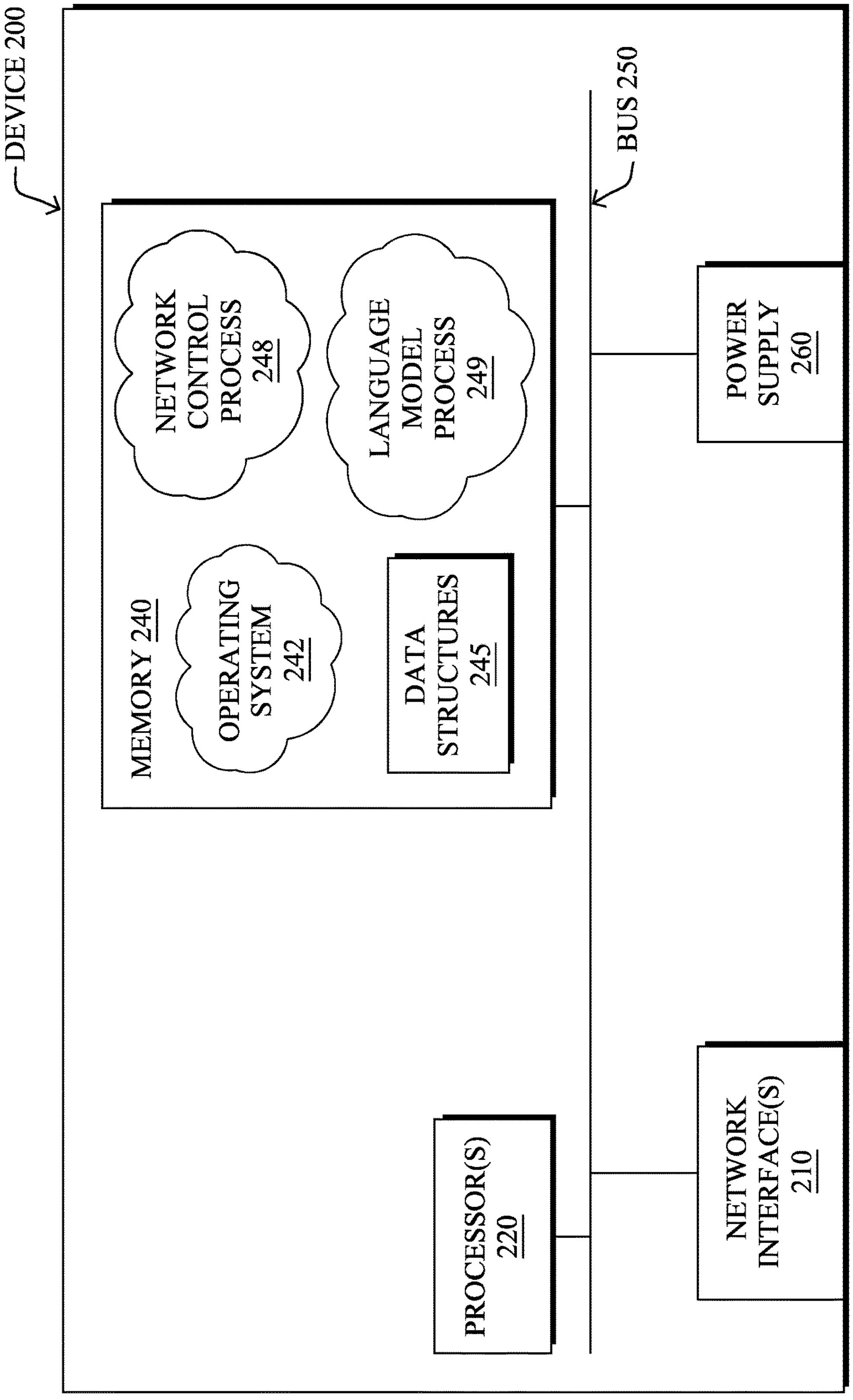
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 and/or language model process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or language model process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
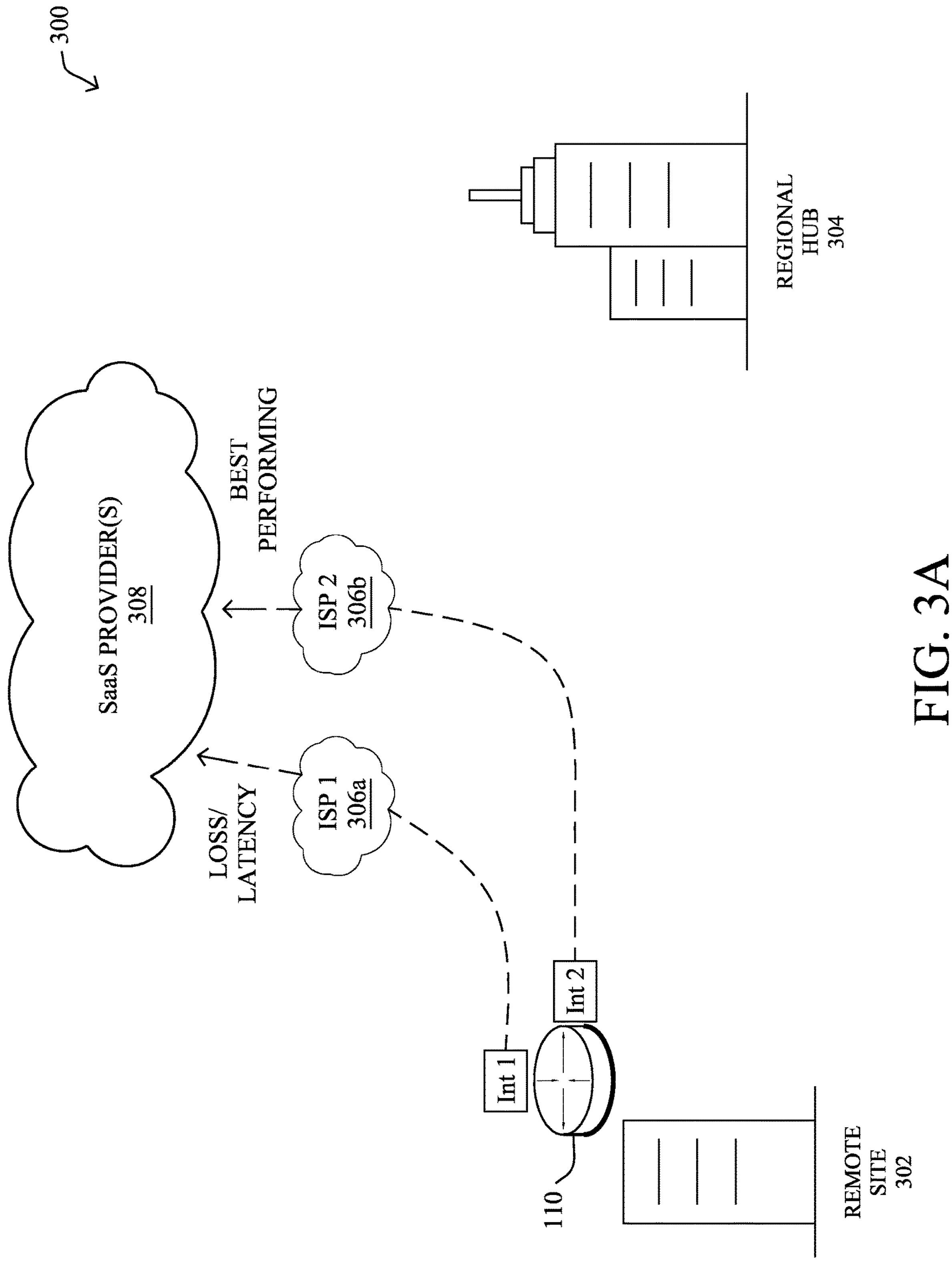
FIGS. 3A-3B illustrate example network deployments.
Figure 3B:
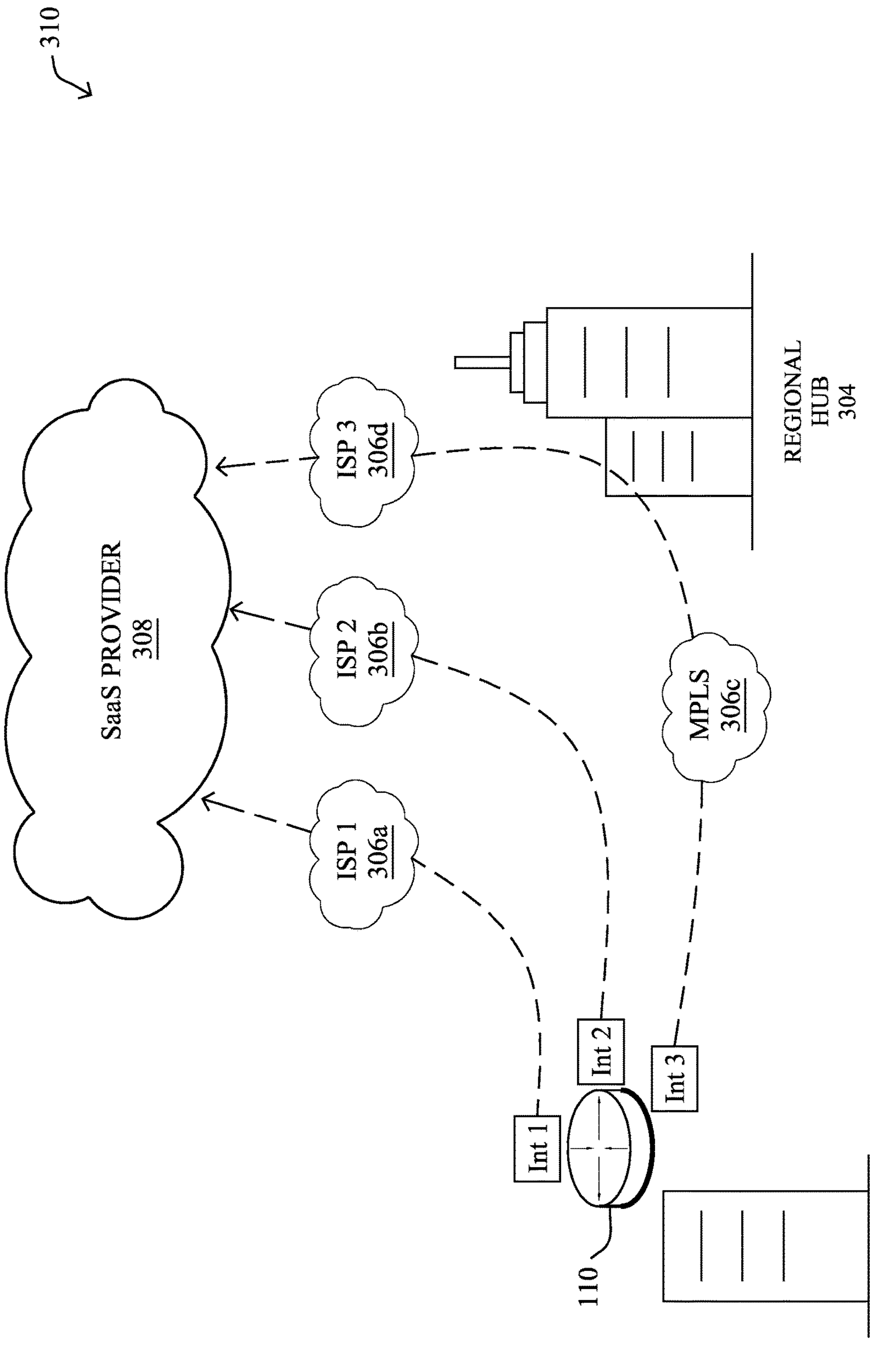

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider(s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
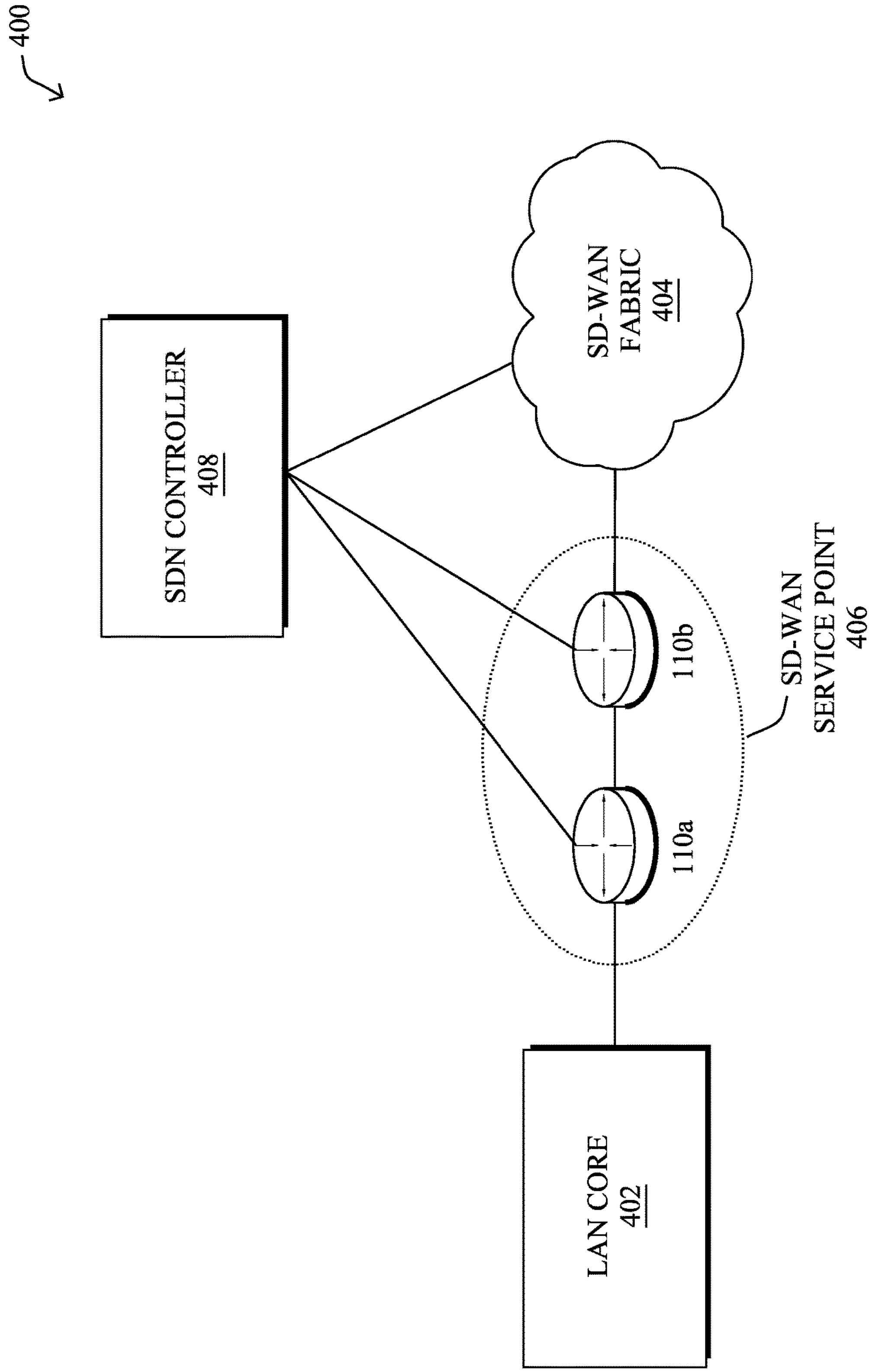
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

- New in-house applications being deployed;
- New SaaS applications being deployed everywhere in the network, hosted by a number of different cloud providers;
- Internet, MPLS, LTE transports providing highly varying performance characteristics, across time and regions;
- SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The introduction of plugins is a major development that enables LLM-based agents to interact with external systems and empower new domain-specific use cases. In the context of communication networks, the utilization of plugins allows LLMs to engage with documentation repositories, tap into knowledge bases, and interface with live network controllers and devices potentially opening the path to LLMs undertaking more complex tasks such as on-demand troubleshooting, device configuration, and performance monitoring. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

Machine learning is highly empirical, i.e., few algorithms offer any guarantee of performance or correctness. LLMs are no exception to this rule. On the contrary, the sheer complexity of these models makes their interpretation very challenging. While one can develop relatively robust intuitions, supported by tools such as TreeExplainer, of why a Gradient Boosted Tree (GBT) will misclassify a data sample, it is close to impossible to make such interpretations for why a token is assigned a higher probability than another in an LLM. Furthermore, LLMs suffer from brittleness such as prompt boundaries and adversarial attacks to which all neural networks are vulnerable. Moreover, LLM-based systems do involve a number of other components with numerous attributes that collectively contribute to the overall efficacy of the system.

When applied in the context of communication networks and used to solve complex tasks such as network troubleshooting and monitoring, even advanced LLM agents frequently struggle with issues such as hallucinations (making up facts in an otherwise convincing tone) and consistency (providing the same answer when prompted with same question multiple times). Accurately and reliably evaluating the performance of LLM agents in the context of tasks such as the ones previously mentioned, is a non-trivial ask and has so far been lacking. In addition, agents are complex state machines with many hyper-parameters (which models to use, which prompts to use, how to integrate retrieval and planning, etc.), and assessing how to improve an existing agent can be a tall order without a very systematic approach with strong quantitative grounds.

Evaluation Framework for LLM-Based Network Troubleshooting and Monitoring Agents The techniques herein introduce an extensive evaluation framework, which combines: 1.) a benchmark of network-specific questions curated by subject matter experts, each accompanied by a solution in the form of code snippets using the APIs or software development kits (SDKs) of the network controllers, 2.) a performance evaluation framework that assesses the ability of the troubleshooting agent to answer the benchmark questions, offering metrics that go beyond mere accuracy (e.g., the fraction of questions that are correctly answered), and/or 3.) a flexible orchestration engine that acts as a 'gamemaster' by performing evaluations across diverse network environments and troubleshooting scenarios and allowing for easy performance comparisons across various LLM models, configurations, and prompting strategies.

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Specifically, according to various implementations, a device uses a large language model-based agent to perform a task in a network, to obtain a first result. The device executes code in the network to perform the task, to obtain a second result. The device makes a comparison between the first result and the second result. The device provides, based in part on the comparison, one or more performance metrics for the large language model-based agent for display.

Figure 5:
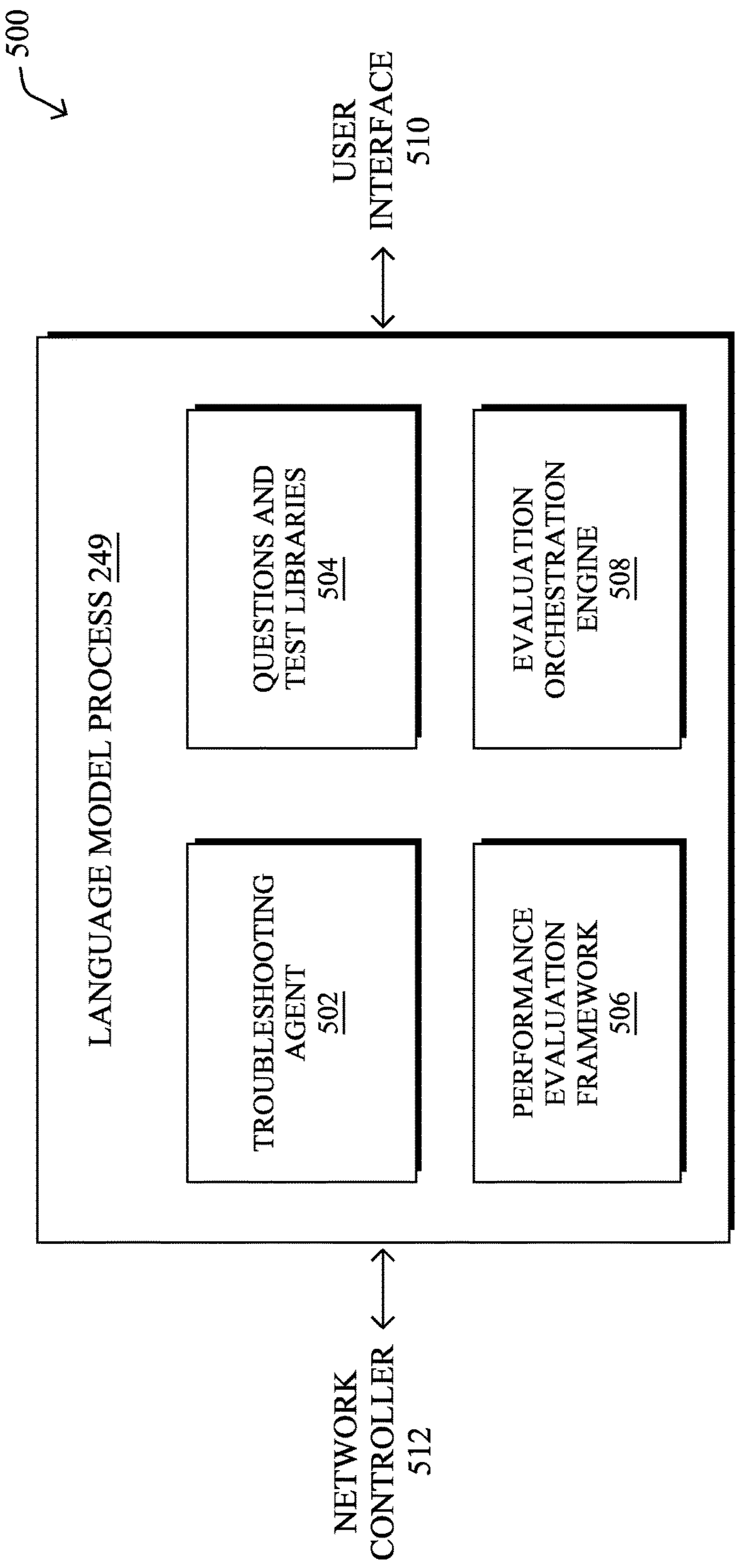
FIG. 5 illustrates an example architecture for an evaluation framework for a large language model (LLM)-based network troubleshooting and monitoring agents.

Operationally, FIG. 5 illustrates an example architecture for an evaluation framework for a large language model (LLM)-based network troubleshooting and monitoring agents, according to various implementations. At the core of architecture 500 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 512, either locally or via a network, such as via one or more application programming interfaces (APIs), etc. In addition, language model process 249 may communicate with any number of user interfaces, such as user interface 510.

As shown, language model process 249 may include any or all of the following components: a troubleshooting agent 502, question and test libraries 504, a performance evaluation framework 506, and/or an evaluation orchestration engine 508. As would be appreciated, the functionalities of these components may be combined or omitted, as desired. In addition, these components may be implemented on a singular device or in a distributed manner, in which case the combination of executing devices can be viewed as their own singular device for purposes of executing language model process 249.

According to various implementations, troubleshooting agent 502 may leverage one or more LLMs to troubleshoot an issue, find the actual root cause for the issue, and/or suggest a set of one or more actions to fix the issue. Let ai denote an action used for troubleshooting an issue I and let Ai denote an action (configuration change) on the network (closed-loop control). In various instances, issue I may be raised by an end user, a set of users, or detected automatically within the network.

The set of actions Ai required to solve the issue I may be determined on-the-fly by the LLM of troubleshooting agent 502, statically determined according to a cookbook for each trajectory made of a set of action ai, or the like. For example, a static cookbook may be used to map a specific ak to set of actions Ak,l. Consider the action ak="Check the priority queue length of a router," a static set of action ak,l may be used to trigger a set of 1 action on the network (e.g., "Change the weight of the priority queue," "Modify the WRED parameter for the high priority queue"). In another implementation, the system may discover the set of required actions related to a given root cause identified thanks to a set of action ai, using reinforcement learning or another suitable approach.

If the root cause identified by troubleshooting agent 502 for issue I is eligible for automated action (e.g., according to a policy), troubleshooting agent 502 may perform any or all of the following:

- Troubleshooting agent 502 retrieves the set of action Ai for the root cause of issue I after activating a timer T (max time to solve the issue)
- Troubleshooting agent 502 may also employ various optimization criterion may be used for solving a given task T. For instance, troubleshooting agent 502 may solve some tasks with objective metrics such as reducing the processing time or improve accuracy even at the risk of involving more steps and tokens (cost). In the context of the techniques herein, the issue criticality may also drive the optimization criteria (e.g., time versus reliability versus cost). In one implementation, the optimization criteria may be unique and decided according to policy and criticality. In another implementation, troubleshooting agent 502 may trigger multiple actions in parallel, each with different optimization criterion. For example, for a given issue I, troubleshooting agent 502 may send a request to a first LLM with a first criteria (e.g., solve as quickly as possible, optimizing time) and send the same request to a second LLM with different optimization criteria (e.g., efficiency). In such a case, troubleshooting agent 502 may use the reply to the first request (set of resolution action Ai) to quickly fix the network, followed by using the second set of actions to optimize the resolution of the issue. Note that both requests may not overlap in terms of closed-loop actions, as well.

As would be appreciated, while troubleshooting agent 502 may be capable of performing complex troubleshooting tasks and, in some instances, taking automated action to correct issues in the network, its general functionality may also include tasks such as simply monitoring the status or performance of the network, as well as performing configuration changes, even in the absence of an existing issue.

In various implementations, test libraries 504 may include a set of questions created by a community of subject matter experts (SMEs) with extensive knowledge in one or more solution domains (e.g., campus switching, wireless, SD-WAN, etc.). In a first step, test libraries 504 may collect a list of questions from the SMEs using a dedicated application, Google or Microsoft form, or any other standardized interface (e.g., user interface 510). During the submission process, SMEs may not only provide the questions that the troubleshooting agent 502 must answer, but also additional information about the high-level procedure that an experienced user should follow to get to the correct answer, along with details about the expected output (such as a table, a sentence, a number, etc.).

By way of example, FIGS. 6A-6C illustrates an example form 600 to collect questions from a subject matter expert (SME). As shown, language model process 249 may present form 600 via user interface 510 to any number of SMEs, in order to populate test libraries 504 with questions with which to test troubleshooting agent 502.

In some instances, the questions may also be further classified based on criteria such as the following:

Technology Domain (Single or Multi-Domain):

- Viptela SD-WAN
- Meraki SD-WAN
- DNAC (Wireless, Switching)
- Thousand Eyes
- AppDynamics
- Crosswork: Network Controller (CNC), Optimization Engine (COE), Evolved Programmable Network Manager (EPNM), WAN Automation Engine (WAE), Network Services Orchestrator (NSO)
- Nexus Cloud
- Intersight
- ACI Use Case: Troubleshooting, Assurance/Monitoring, Configuration Assistance Difficulty (for a user to answer the question):

- Easy: the question can be answered by employing a single API call or running a single command line interface (CLI) command/visiting a single page
- Medium: the question requires combining information across multiple API calls from a single domain Hard: the question requires complex Scenario: Does the question apply to a particular troubleshooting a particular scenario (e.g.: access point down, high wan latency, etc.)

In a second step, test libraries 504 may communicate with any number of user interfaces, such as user interface 510, to translate each submitted question into a test case. Generally, each test case may include instructions to perform the actions that troubleshooting agent 502 would be expected to perform in order to answer the corresponding question.

By way of example, FIG. 7 illustrates an example snippet of a testcase 700 to assess an LLM-based network troubleshooting and monitoring agents. As shown, testcase 700 may assesses whether troubleshooting agent 502 can identify the site of a given user and its health score. More specifically, testcase 700 computes the answer using the DNA-C SDK and yields expectations that troubleshooting agent 502 should fulfil. The assertion ExpectedMethods checks that troubleshooting agent 502 uses the same method as the expert used, and OutputShouldContain checks that the final answer contains the correct site name and health score.

Each time the test is instantiated, the solution code snippet (steps to answer the question) is run in the background while at the same time the question is posted to the LLM model, and its output fulfills the role of ground truth against which the response of the LLM model is evaluated.

As such, the solution part of the test case is responsible for interacting with the network domain and collecting the up to date real time information required to answer the question. In the example snippet of testcase 700, the solution code first calls the users.get_user_enrichment_details DNAC SDK method, and the healthScore and user location are extracted from the response. Following this approach allows the testcases to dynamically adapt to any changes in the underlining test network conditions, should the health score of user John decrease or increase over time, or should the user not be present on the network at all.

The tests yield so-called expectations or assertions about what troubleshooting agent 502 should do or answer. In the snippet shown in FIG. 7, similarly to the solution part of the code, troubleshooting agent 502 is expected to use the method users.get_user_enrichment_details of the DNA-C SDK, and extract correctly the health score using healthType== "OVERALL." Finally, its output must contain the correct location name and the health score.

In various implementations, performance evaluation framework 506 may be responsible for evaluating the performance of troubleshooting agent 502 against a set of test cases (questions), collectively grouped into an evaluation session. For each test case, performance evaluation framework 506 may compile an evaluation result with information such as any or all of the following:

- Whether any error was encountered, and how many. Errors denote factual mistakes (e.g., the agent fails to answer or provides an incorrect answer) or security issues (e.g., the agent performs a disallowed action).
- Whether any warning was encountered, and how many. Warnings denote substandard behaviors (e.g., the agent used a bullet list instead of a table) or inaccuracies (e.g., the agent did not add units to a numerical quantity, or a plot lacked some legend).
- The list of methods used by the agent.
- The list of methods expected to be used by the agent.
- The runtime of the agent.
- The number of tokens consumed, which can be translated into a cost.
- The number of steps performed by troubleshooting agent 502 (e.g., back-and-forth with the LLM).

Figure 8:
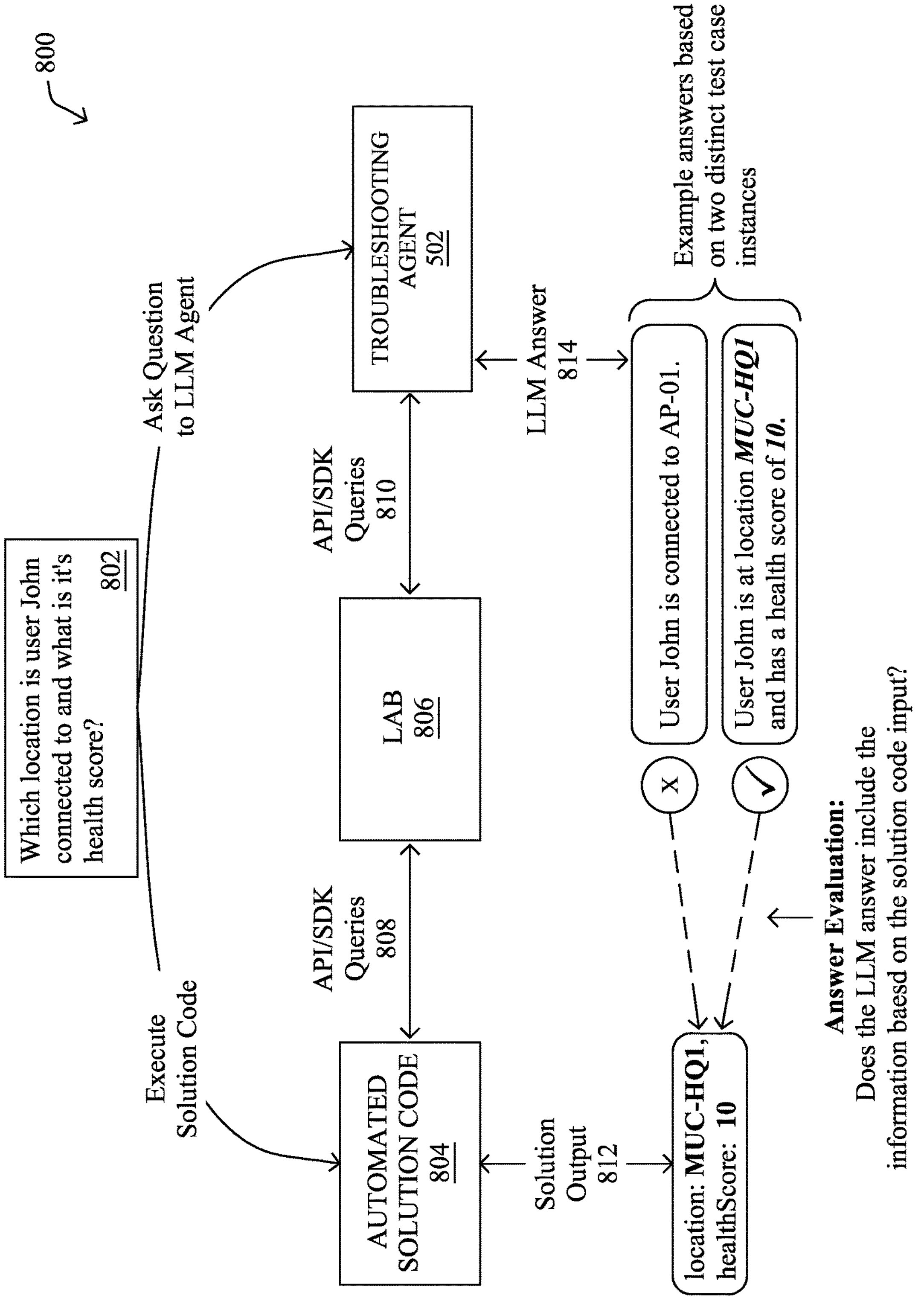
FIG. 8 illustrates an example showing the evaluation of an answer by an LLM-based network troubleshooting and monitoring agents.

FIG. 8 illustrates an example 800 showing the evaluation of an answer by an LLM-based network troubleshooting and monitoring agents. As shown, performance evaluation framework 506 may operate by evaluating a question 802 from test libraries 504 in two ways: 1.) by sending question 802 to troubleshooting agent 502 and 2.) by executing the automated solution code 804 associated with question 802 as part of its testcase.

In turn, troubleshooting agent 502 may attempt to answer question 802 by issuing API or SDK-based queries to one or more devices in the target network, thereby generating an LLM answer 814. Here, the network may take the form of a lab 806 or other test environment, although a live network could also be used, in some instances. Similarly, test libraries 504 may also execute automated solution code 804 via API or SDK-based queries 808 to one or more devices in the target network, to generate a solution output 812.

To evaluate the performance of troubleshooting agent 502, it may then compare solution output 812 to LLM answer 814. In this case, for the answer to be considered correct, it must include the exact location and value of the health score. As shown, the location indicated by solution output 812 is "MUC-HQ1" with a health score of "10." Thus, if LLM answer 814 indicates that John is connected to "AP-01," it will have failed the evaluation, as it did not sufficiently answer question 802.

However, more complex evaluation scenarios demand special handling. For instance, evaluating whether troubleshooting agent 502 correctly answered a monitoring task (e.g.: Visualize the QoS drops on device muc-hq01-rt01, interface Gi0/0/1.) is significantly more challenging. In such cases, a dedicated assertion method is required to compare the underlining time series data used to build the graph. Although the LLM code and the automated solution code query the network simultaneous, slight time-related differences may occur. Therefore, when comparing the two answers, only the overlapping time interval should be considered.

The evaluation of other question types, such as those related to root causing network issues (e.g.: Can you help me figure out why John can't authenticate to the network?) present a different set of challenges. Like a human, troubleshooting agent 502 may employ many different strategies to troubleshoot the issue and formulate an answer. The LLM may also use different wording to formulate the answer making the evaluation much more difficult.

In some implementations, performance evaluation framework 506 may also conduct tests that include root-cause identification questions based on predefined scenarios executed against a network environment using a system such as a 'troublemaker' mechanism that instantiates an issue in the network and, as such, the root cause of the issue is known a priori. This allows the solution part of the testcase to be simplified to a logic block that confirms the existence of the root cause instead of going through all the troubleshooting steps.

Evaluating the LLM's answer in this context can then be accomplished using two methods. In one approach, the SME writing the test case defines a number of alternate acceptable answers against which the LLM answer can be compared, such as the example snippet 900 in FIG. 9 of expected outputs of an LLM-based network troubleshooting and monitoring agent. As shown, troubleshooting agent 502 is expected to identify that John's authentication issues are related to a communication issue with the authentication, authorization, and accounting (AAA) server caused by packets being discarded by a firewall policy. Multiple syntactical variants of the answer are considered acceptable as long as they include key elements like the affected service name or IP address, the impact (drop, discard) and the point of failure (the firewall policy name).

In a second approach, performance evaluation framework 506 may employ an LLM to assess the equivalence between the root cause description, as provided by the scenario definition for the troublemaker, and the response generated by troubleshooting agent 502. This method offers greater flexibility and does not necessitate the manual definition of numerous alternate answers.

Performance evaluation framework 506 may then aggregate the evaluation results across all test cases that are part of the same evaluation session into metrics, such as any or all of the following below:

TABLE 1

| Metric | Definition | Interpretation |
|---|---|---|
| Efficacy | Fraction of test cases without error. | Our main metric, which denotes the overall efficacy of the agent on our benchmark. |
| Token Efficiency | The number of tokens consumed by the agent (averaged across runs). | A secondary metric that indicates whether the agent uses token efficiently. |
| Median Response Time | The median response time across all questions. | A secondary metric that indicates how fast the responses are. This is an important indicator for the usability of the product. |
| Method Precision | The fraction of used methods that were expected (averaged across runs) | A secondary metric that indicates how effective the agent is in using the API or SDK. It is penalized when using extra methods. |
| Method Recall | The fraction of expected methods that were used (averaged across runs) | A secondary metric that indicates whether the agent discovered the strategy to perform the task. Usually, a partial recall leads to a failure. |
| Code Reliability | The fraction of code executions that did not lead to an exception (averaged across runs). | A secondary metric that indicates how reliable the code produced by the agent is. |
| Search Recall | The recall of the semantic search (averaged across runs). | A troubleshooting metric that evaluates the fraction of relevant methods retrieved by the semantic search. |
| Search Precision | The precision of the semantic search (averaged across runs). | A troubleshooting metric that evaluates the fraction of relevant methods among the retrieved methods. |
| Search Accuracy | Fraction of test cases that had a recall of 1.0. | A troubleshooting metric that evaluates whether all the required methods are retrieved by the semantic search. |
| Error rate | Average number of errors per test case. | A secondary metric that evaluates how frequently errors arise. Note that this is different from the efficacy, as more than one error can be raised per test case. |
| Warning rate | Average number of warnings per test case. | A secondary metric that evaluates how frequently warnings arise. |
| Re-producibility | Fraction of runs with the same outcome (either success or failure). | A metric that evaluates how reproducible the test cases are. For instance, a test case that succeeds or fails 3 times out of 5 will have a reproducibility of 60%. The lower bound for this metric is 50%, which means it fails or succeeds half of the time. |

In some implementations, the results of each evaluation may be stored by performance evaluation framework 506 in an AI/Ops tool, with both of commercial SaaS based services (e.g., Weights and Biases) and open-source solutions (Deepchecks, Grafana, etc.) stacks being readily available.

As shown, evaluation orchestration engine 508 may function as a "gamemaster" that is responsible for coordinating the instantiation and execution of new evaluation sessions, from here after called "games." At the start of each game, the gamemaster performs several tasks such as any or all of the following:

LLM model selection and parameter configuration: for each new evaluation session, evaluation orchestration engine 508 may select the LLM model that should be used by troubleshooting agent 502 to answer the questions or combination of models in such cases where different models are used for different tasks (e.g., one LLM model for planning and a different LLM for code generation). This may also entail selecting configuration parameters, such as:

model temperature which regulates the randomness, or creativity of the LLM model, maximum number of tokens consumed to answer a question, maximum number of steps allowed to be performed to answer a question, prompting strategy, should multiple ones be available.

Environment and scenario instantiation: before a 'game' can start, evaluation orchestration engine 508 may prepare a target network environment to be used by troubleshooting agent 502 to answer the questions. During this step, evaluation orchestration engine 508 can leverage a troublemaker system to instantiate one or more impairments on the target environment corresponding to specific troubleshooting scenarios (e.g., high WAN circuit latency, congestion, Wi-Fi network issues, authentication problems, etc.). Depending on the nature of the troublemaker scenario, evaluation orchestration engine 508 may be required to wait for a certain amount of time, required for the issue to be detected by the various network controllers and monitoring systems present in the target environment, before asking troubleshooting agent 502 to answer questions (troubleshoot).

Select a list of questions (test cases) for troubleshooting agent 502: evaluation orchestration engine 508 may query test libraries 504 for the list of available test cases. The evaluation session may include all available questions or can be more specific towards a certain networking domain (DNAC, SD-WAN, ISE) or impairment scenario, for example, questions related to troubleshooting wireless authentication issues. In one embodiment, evaluation orchestration engine 508 may use the static test case tags (domain, issue category, scenario) to select the appropriate questions from test libraries 504 while in another it may leverage other mechanisms such as semantic search of test libraries 504 or employ an LLM to review the test cases from test libraries 504 and extract the relevant items.

Finally, once the above tasks are completed, evaluation orchestration engine 508 triggers a new evaluation run by invoking performance evaluation framework 506 with the selected list of questions. Evaluation orchestration engine 508 can be used to achieve several goals:

In one instance, evaluation orchestration engine 508 may be leveraged to evaluate and compare the performance of different LLM models (or combinations of LLM models) for network monitoring and troubleshooting tasks either in general or targeted on more specific domains, and categories of issues. In this case, the same set of questions is run against a list of LLM models of interest, and performance statistics are collected.

In another instance, evaluation orchestration engine 508 may be leveraged to help train LLM agents. In this second case, evaluation orchestration engine 508 is responsible for executing large amounts of games (evaluation runs) that in turn result in an extensive collection of traces to be used in a reinforcement learning-based training process.

In yet another instance, a similar approach of generating large amounts of games can be used with the goal of compiling a database of reusable code snippets.

Finally, in some instances, language model process 249 may interface with user interface 510 to allow a system administrator to configure and monitor the behavior of evaluation orchestration engine 508 and the overall system. Using user interface 510, the administrator could schedule new evaluation sessions (games) and monitor the execution of such games closely. To this end, user interface 510 may use API integrations with an AIOps platform of choice to build summarized views of the evaluation results, however, a detailed review of the results may only be available in the AIOps platform itself.

Figure 10:
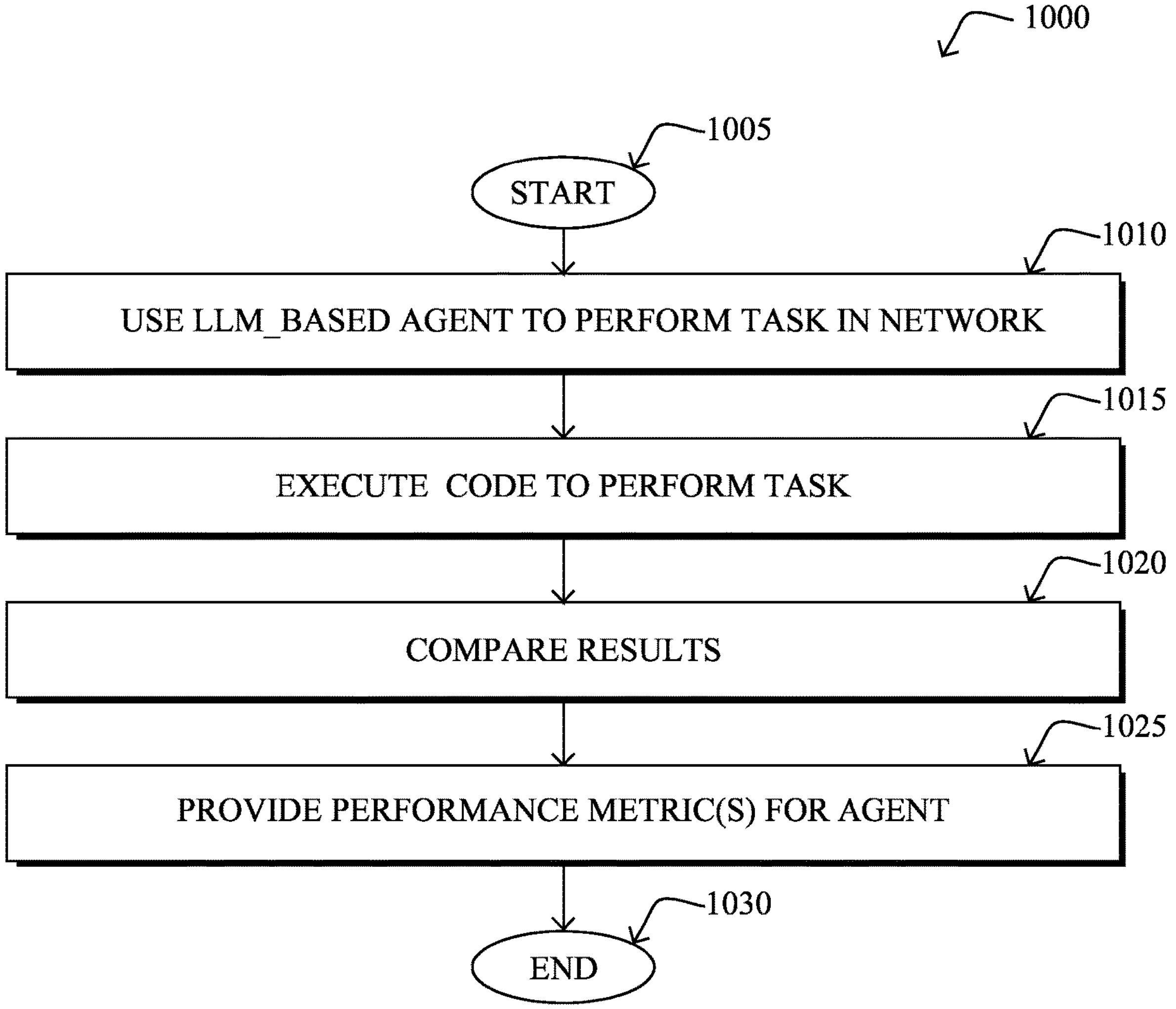
FIG. 10 illustrates an example simplified procedure for evaluating an LLM-based network troubleshooting and monitoring agents.

FIG. 10 illustrates an example simplified procedure 1000 (e.g., a method) for evaluating LLM-based network troubleshooting and monitoring agents, in accordance with one or more implementations described herein. For example, a non-generic, specifically configured device (e.g., device 200), such as a router, firewall, controller for a network (e.g., an SDN controller or other device in communication therewith), server, or the like, may perform procedure 1000 by executing stored instructions (e.g., language model process 249 and/or network control process 248). The procedure 1000 may start at step 1005, and continues to step 1010, where, as described in greater detail above, the device may use an LLM-based agent to perform a task in a network, to obtain a first result. In some implementations, the device may do so in part by configuring the LLM-based agent using a parameter that controls at least one of: a prompting strategy used by the LLM-based agent to perform the task, a degree of randomness of a LLM used by the LLM-based agent to perform the task, a maximum number of tokens the LLM-based agent can use to perform the task or a maximum number of steps the LLM-based agent is allowed to perform to complete the task. In one implementation, the device may use the agent to perform the task by sending a text-based question to the LLM-based agent.

At step 1015, as detailed above, the device may execute code in the network to perform the task, to obtain a second result. In various implementations, the device may also send a request for a subject matter expert to answer a questionnaire and translate answers to the questionnaire into the task and the code for execution in the network to perform the task. In various cases, the task comprises at least one of: troubleshooting an issue in the network, monitoring the network, or configuring a portion of the network. In some cases, the task also has an associated difficulty rating specified by a user.

At step 1020, the device may make a comparison between the first result and the second result. For instance, in the case of performing a monitoring task such as "which location is user John connected to?" the comparison may assess whether the agent returned the same information as that of the executed code. In some implementations, the device may also use reinforcement learning to train the LLM-based agent, based on comparison.

At step 1025, the device may provide, based in part on the comparison, one or more performance metrics for the LLM-based agent for display. In various implementations, the one or more performance metrics comprise at least one of: an efficacy metric, a recall metric, a precision metric, an error rate, or a response time.

Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for an evaluation framework for LLM-based network troubleshooting and monitoring agents, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:

using, by a device, a large language model-based agent to perform a task in a network, to obtain a first result related to a first detected state of the network;

causing execution of predetermined code to perform the task, to obtain a second result related to a second detected state of the network, the execution of the predetermined code including communicating with one or more network devices in the network, the predetermined code being associated with input previously provided by one or more users;

making, by the device, a comparison between the first result and the second result; and providing, by the device and based in part on the comparison, one or more performance metrics for the large language model-based agent for display.

2. The method as in claim 1, wherein using the large language model-based agent to perform the task in the network comprises:

instructing the large language model-based agent to use a particular large language model to perform the task.

3. The method as in claim 1, wherein using the large language model-based agent to perform the task in the network comprises:

configuring the large language model-based agent using a parameter that controls at least one of: a prompting strategy used by the large language model-based agent to perform the task or a degree of randomness of a large language model used by the large language model-based agent to perform the task.

4. The method as in claim 1, wherein using the large language model-based agent to perform the task in the network comprises:

configuring the large language model-based agent using a parameter that controls at least one of: a maximum number of tokens the large language model-based agent can use to perform the task or a maximum number of steps the large language model-based agent is allowed to perform to complete the task.

5. The method as in claim 1, further comprising:

sending, by the device, a request for a subject matter expert to answer a questionnaire; and translating, by the device, answers to the questionnaire into the task and the predetermined code.

6. The method as in claim 1, wherein the task comprises at least one of: troubleshooting an issue in the network, monitoring the network, or configuring a portion of the network.

7. The method as in claim 1, wherein the task has an associated difficulty rating specified by a user.

8. The method as in claim 1, wherein using the large language model-based agent to perform the task in the network comprises:

sending a text-based question to the large language model-based agent.

9. The method as in claim 1, further comprising:

using reinforcement learning to train the large language model-based agent, based on the comparison.

10. The method as in claim 1, wherein the one or more performance metrics comprise at least one of: an efficacy metric, a recall metric, a precision metric, an error rate, or a response time.

11. An apparatus, comprising:

one or more network interfaces;

a processor coupled to the one or more network interfaces; and a memory configured to store instructions that, when executed by the processor, configure the processor to:

use a large language model-based agent to perform a task in a network, to obtain a first result related to a first detected state of the network;

cause execution of predetermined code to perform the task, to obtain a second result related to a second detected state of the network, the execution of the predetermined code including communicating with one or more network devices in the network, the predetermined code being associated with input previously provided by one or more users;

make a comparison between the first result and the second result; and provide, based in part on the comparison, one or more performance metrics for the large language model-based agent for display.

12. The apparatus as in claim 11, wherein the processor is configured to use the large language model-based agent to perform the task in the network by:

instructing the large language model-based agent to use a particular large language model to perform the task.

13. The apparatus as in claim 11, wherein the processor is further configured to:

configure the large language model-based agent using a parameter that controls at least one of: a prompting strategy used by the large language model-based agent to perform the task or a degree of randomness of a large language model used by the large language model-based agent to perform the task.

14. The apparatus as in claim 11, wherein the processor is further configured to:

configure the large language model-based agent using a parameter that controls at least one of: a maximum number of tokens the large language model-based agent can use to perform the task or a maximum number of steps the large language model-based agent is allowed to perform to complete the task.

15. The apparatus as in claim 11, wherein the processor is further configured to:

send a request for a subject matter expert to answer a questionnaire; and translate answers to the questionnaire into the task and the predetermined code.

16. The apparatus as in claim 11, wherein the task comprises at least one of: troubleshooting an issue in the network, monitoring the network, or configuring a portion of the network.

17. The apparatus as in claim 11, wherein the task has an associated difficulty rating specified by a user.

18. The apparatus as in claim 11, wherein the processor is configured to use the large language model-based agent to perform the task in the network by:

sending a text-based question to the large language model-based agent.

19. The apparatus as in claim 11, wherein the processor is further configured to:

use reinforcement learning to train the large language model-based agent, based on the comparison.

20. A tangible, non-transitory, computer-readable medium storing program instructions that cause a device to execute a process comprising:

using, by the device, a large language model-based agent to perform a task in a network, to obtain a first result related to a first detected state of the network;

causing execution of predetermined code to perform the task, to obtain a second result related to a second detected state of the network, the execution of the predetermined code including communicating with one or more network devices in the network, the predetermined code being associated with input previously provided by one or more users;

making, by the device, a comparison between the first result and the second result; and providing, by the device and based in part on the comparison, one or more performance metrics for the large language model-based agent for display.

* * * * *